US010500425B2

(12) United States Patent
Rolland et al.

(10) Patent No.: US 10,500,425 B2
(45) Date of Patent: Dec. 10, 2019

(54) FULL HOOD RESPIRATOR (71) Applicant: L'Air Liquide, Societe Anonyme pour l'Etude et l'Exploitation des Procedes Georges Claude, Paris (FR)

(72) Inventors: Christian Rolland, Vif (FR); Vincent Graziani, Chabons (FR); Pierrick Cohard, Les Abrets (FR); Rachid Makhlouche, Grenoble (FR); Xavier Roussin-Bouchard, Meaudre (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 866 days.

(21) Appl. No.: 14/814,886

(22) Filed: Jul. 31, 2015

(65) Prior Publication Data
US 2016/0030776 A1 Feb. 4, 2016

(30) Foreign Application Priority Data

Aug. 1, 2014 (FR) ...................................... 14 57490

(51) Int. Cl.
*A62B 18/04* (2006.01)
*A62B 17/04* (2006.01)
(Continued)

(52) U.S. Cl.
CPC .......... *A62B 17/04* (2013.01); *A41D 13/1153* (2013.01); *A41D 13/1184* (2013.01);
(Continued)

(58) Field of Classification Search
CPC .......... A62B 7/02; A62B 9/027; A62B 17/04; A62B 19/00; A62B 7/14; A62B 25/00;
(Continued)

(56) References Cited

U.S. PATENT DOCUMENTS 2,296,338 A 9/1942 Dakin
2,335,474 A * 11/1943 Beall ........................ A62B 9/00
128/202.11
(Continued)

FOREIGN PATENT DOCUMENTS

EP  1 793 147           6/2007
GB    752246 A *       7/1956 ........... B65D 47/266
(Continued)

OTHER PUBLICATIONS

French Search Report and Written Opinion for FR 1 457 490, dated Mar. 18, 2015.
(Continued)

*Primary Examiner* — Annette Dixon
(74) *Attorney, Agent, or Firm* — Christopher J. Cronin (57) ABSTRACT Full hood respirator comprising a fluidtight flexible bag intended to be slipped over the head of a user, the flexible bag being provided with a transparent window and comprising, in its lower part, a rigid base element of annular overall shape intended to be positioned around the neck of the user, the base element comprising a tubular oxygen reservoir of pressurized oxygen provided with a calibrated outlet orifice opening into the internal volume of the flexible bag, characterized in that the base element comprises at least two rigid parts connected by an articulation, the two parts being movable relative to one another between a furled first position that prevents a head from entering the hood through the base element and an unfurled position of use that allows a head to enter the hood through the base element.

10 Claims, 3 Drawing Sheets (51) Int. Cl.
*B64D 25/00* (2006.01)
*A62B 7/14* (2006.01)
*A41D 13/11* (2006.01)

(52) U.S. Cl.
CPC .............. *A62B 7/14* (2013.01); *A62B 18/04* (2013.01); *B64D 25/00* (2013.01); *B64D 2231/025* (2013.01)

(58) Field of Classification Search
CPC ........... A62B 18/04; A62B 21/00; A62B 7/08; A62B 7/10; A42B 3/32; A61M 16/0825; A61M 16/0816; A61M 16/00; A61M 16/0009; A61M 16/06; A61M 16/0627; A61M 16/107; A61M 16/20; A61M 16/22; A61M 2016/0027; A61M 2016/003; A61M 2202/0208; A61M 2202/025; A61M 2205/3331; A61M 2205/7545; A41D 13/0005; A41D 13/1153; A41D 13/1184; A41D 2300/30; A61G 10/04; B01D 53/62; B63C 11/24; B64D 2231/025; B64D 25/00; Y02C 10/04
USPC ............ 128/201.25, 201.23, 201.13, 201.22, 128/201.28, 201.29, 202.26, 203.21, 128/204.11, 204.25, 204.26, 205.12, 128/205.17, 205.22, 205.25, 205.26, 128/205.27, 205.28, 206.24; 2/171.3, 2/205, 421, 5, 6.2; 422/122, 305
See application file for complete search history.

(56) References Cited

U.S. PATENT DOCUMENTS

| | | | | |
|---|---|---|---|---|
| 4,116,237 A * | 9/1978 | Birch | ............... | A62B 17/04 128/201.11 |
| 4,552,140 A * | 11/1985 | Cowley | ............... | A62B 17/04 128/201.25 |
| 4,875,718 A * | 10/1989 | Marken | ............... | A61M 39/1055 285/148.15 |
| 4,889,113 A * | 12/1989 | Pelloux-Gervais | .... | A62B 17/04 128/201.25 |
| 4,896,665 A * | 1/1990 | Gervais | ............... | A62B 17/04 128/201.22 |
| 5,113,854 A * | 5/1992 | Dosch | ............... | A62B 7/08 128/201.23 |
| 5,526,804 A * | 6/1996 | Ottestad | ............... | A62B 7/02 128/201.22 |
| 6,367,085 B1 | 4/2002 | Berg | | |
| 6,443,153 B1 * | 9/2002 | Viljanen | ............... | A61F 9/068 128/205.22 |
| 6,550,479 B1 * | 4/2003 | Duxbury | ............... | A62B 7/10 128/205.27 |
| 6,971,386 B2 * | 12/2005 | Duxbury | ............... | A62B 7/10 128/205.27 |
| 7,188,869 B2 * | 3/2007 | Garraffa | ............... | B63C 11/2227 128/202.27 |
| 2006/0032509 A1 * | 2/2006 | Milles | ............... | A61M 16/009 128/205.12 |
| 2007/0084463 A1 * | 4/2007 | Niemann | ............... | A61M 16/06 128/201.25 |
| 2007/0209663 A1 * | 9/2007 | Marque | ............... | A61M 16/0683 128/207.11 |
| 2008/0236195 A1 * | 10/2008 | Woebke | ............... | A44C 5/003 63/1.14 |
| 2013/0306060 A1 * | 11/2013 | Cota | ............... | A61M 11/06 128/200.14 |

FOREIGN PATENT DOCUMENTS

| | | |
|---|---|---|
| WO | WO 2012/156727 | 11/2012 |
| WO | WO 2014/031671 | 2/2014 |

OTHER PUBLICATIONS

French Search Report and Written Opinion for FR 1 457 491, dated Mar. 18, 2015.
Graziani, et al., "Full Hood Respirator," U.S. Appl. No. 14/814,900, filed Jul. 31, 2015.

* cited by examiner

FULL HOOD RESPIRATOR

CROSS-REFERENCE TO RELATED APPLICATIONS

This application claims the benefit of priority under 35 U.S.C. § 119 (a) and (b) to French patent application No. 1457490, filed Aug. 1, 2014, the entire contents of which are incorporated herein by reference.

BACKGROUND

Field of the Invention

The present invention relates to respiratory equipment. The invention relates more particularly to a full-hood respirator, notably for an aircraft.

Related Art

Full-hood respirators are conventionally used onboard aeroplanes when the cabin atmosphere is vitiated (depressurized, smoke, chemical agents, etc).

This equipment must also notably allow the flight crew to tackle the problem, provide emergency assistance to the passengers and manage a potential evacuation of the aircraft.

The technical specifications for such devices are defined according to class of use (in-flight damage, protection against high-altitude hypoxia, emergency evacuation on the ground, etc).

Known respiratory equipment chiefly employs two types of oxygen source:

- a chemical brick (also referred to as a "chemical oxygen generator") that generates oxygen by combustion (potassium superoxide —$KO_2$, sodium chlorate —$NaClO_3$, etc), or
- a compressed-oxygen reservoir associated with a calibrated orifice.

The technology using compressed oxygen in a sealed container associated with a calibrated orifice is generally safer. Nevertheless, this type of device may be relatively bulky for being stored in an aeroplane.

In addition, certain users may have problems putting the hood on and keeping it in place under certain circumstances, particularly in a stressful situation.

Known solutions use half-masks or full-face masks. These solutions present problems of sealing because sealing is difficult to achieve with an item of equipment that is intended for universal use. In order to avoid a lack of sealing, the known systems are relatively uncomfortable and take a relatively long time to fit (positioning using straps, buckles or elastics). In addition, the breathing resistance is relatively high (the half-mask channels the fluids in pipes fitted with filter cartridges at its ends).

SUMMARY OF THE INVENTION

One object of the present invention is to alleviate all or some of the abovementioned disadvantages of the prior art.

To this end, the invention is directed a full hood respirator comprising a fluidtight flexible bag intended to be slipped over the head of a user, the flexible bag being provided with a transparent window and comprising, in its lower part, a rigid base element of annular overall shape intended to be positioned around the neck of the user, the base element comprising a tubular oxygen reservoir of pressurized oxygen provided with a calibrated outlet orifice opening into the internal volume of the flexible bag. The base element comprises at least two rigid parts connected by an articulation, the two parts being movable relative to one another between a furled first position that prevents a head from entering the full hood respirator through the base element and an unfurled second position of use that allows a head to enter the hood through the base element.

Moreover, embodiments of the invention may comprise one or more of the following features:

- two parts of the base element consist of two curved tubular portions which are connected at an articulation, the two parts when in the unfurled position forming an open ring,
- the ring opening formed by the two parts in the unfurled position is situated in the region of the front face of the hood, which means to say that side of the hood that comprises the transparent window,
- the two parts of the base element pivot relative to one another at the articulation between the furled and unfurled positions through an angular range comprised between thirty and one hundred and eight degrees,
- the two parts of the base element consist respectively of a tubular oxygen reservoir and of a carbon dioxide filter cartridge, the filter cartridge comprising an inlet communicating with the interior volume of the flexible bag and a filtered-air outlet opening into the interior volume of the flexible bag, the outlet orifice of the tubular oxygen reservoir and the filtered-air outlet of the filter cartridge being arranged relative to one another in such a way as to form a venturi device,
- the at least two parts of the base element comprise two tubular oxygen reservoirs articulated to one another and having at least one oxygen outlet orifice opening into the flexible bag,
- in its furled position, the pressurized gas from the oxygen reservoir is not placed in fluidic communication with the outlet orifice, whereas in its unfurled position, the pressurized gas from the oxygen reservoir is placed in communication with the outlet orifice,
- the full hood respirator comprises a removable plug preventing oxygen from the oxygen reservoir from exiting the outlet orifice when the base element is in the furled position and automatically allowing oxygen to exit the oxygen reservoir via the outlet orifice when the base element is moved from its furled position into its unfurled position,
- the removable plug is moved and/or broken mechanically by collaboration with a stop on the hood when the base element is moved from its furled position into its unfurled position,
- the removable plug is situated in the vicinity of the articulation,
- the articulation of the base element comprises a ball joint equipped with a male component and with a female component which components are situated respectively on each of the two rigid parts,
- the outlet orifice comprises a nozzle directed along a portion of one of the two rigid parts,
- the full hood respirator comprises mechanical stops respectively defining the furled and unfurled positions,
- the full hood respirator comprises a mechanism for keeping the relative position of the two rigid parts stable by elastic deformation in at least one of the following positions: the furled, the unfurled position,
- the base element is secured to the base of the flexible bag, in the furled position, the base element has the overall shape of a closed ring or of an open ring, notably a C-shape, the base of the flexible bag comprises a flexible diaphragm or a fluidtight collar intended to fit around the neck of a user, in the furled position, the longest transverse dimension (in a direction perpendicular to the top/bottom axis of the hood) of the central opening delimited by the base element is comprised between five and ten cm, in the unfurled position, this longest transverse dimension of the central opening delimited by the base element is comprised between twenty and forty cm, a deployment member such as a spring is provided between the two folding parts, said deployment member acting on the base element in order to bring it into its unfurled position, the full hood respirator comprises a flexible suspension member arranged inside the flexible bag, the suspension member forming a hat or cap having a surface area smaller than the surface area of the outer flexible bag, at least part of the border of the suspension member is rigidly connected to the flexible bag, the suspension member being intended to rest on the top of the head of the user at a height somewhere between the base and the top of the hood, the suspension member comprises a portion comprising at least one of the following: a flexible mesh, a cloth, a fabric, an elastic zone, the suspension member comprises a rear portion comprising at least one of the following: a flexible mesh, a cloth, a fabric, an elastic zone, the said rear portion being connected to the rear part of the flexible bag and being intended to rest on the rear part of the top of the head of the user of the full hood respirator, the rear portion is connected to the lower rear part of the flexible bag, the suspension member comprises a portion, notably a front portion, comprising at least one of the following: a rigid or semi-rigid portion such as a helmet portion, the front portion comprises at least one of the following: a rigid or semi-rigid component forming a helmet visor, one of which is connected to the flexible bag above the window, so as to hold the flexible bag out laterally with respect to the user of the hood.

The invention may also relate to any alternative device or method comprising any method of the features listed hereinabove or hereinbelow.

Other specifics and advantages will become apparent from reading the following description given with reference to the figures in which:

DETAILED DESCRIPTION OF THE INVENTION

Figure 1:
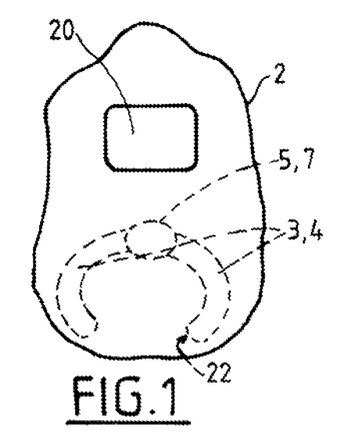
FIG. 1 depicts a schematic and partial front view, showing some of the hidden detail, illustrating the structure of one possible embodiment of a full hood respirator according to the invention in the unfurled position of use.

FIG. 1 schematically depicts a full hood respirator 1 comprising a fluidtight flexible bag 2 equipped with a transparent window 20 intended to be slipped over the head of a user.

Figure 5:
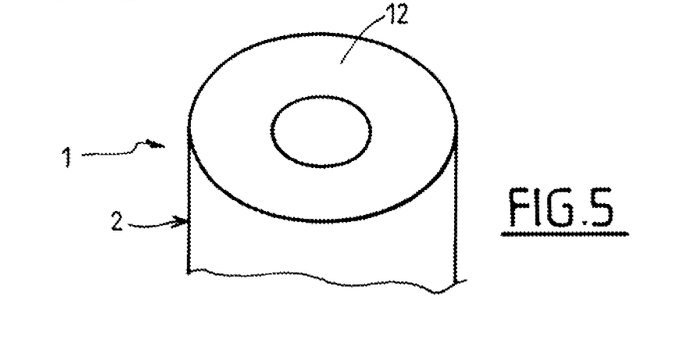
FIG. 5 depicts a view from beneath of a detail of the full hood respirator of FIG. 1 or of FIG. 3, FIGS. 6 and 7 depict perspective views of a base element of the full hood respirator according to the invention in the furled and unfurled positions respectively.

The fluidtight flexible bag 2 is made for example of a fire retardant textile that is fluidtight or made to be fluidtight, for example of the type marketed under the Nomex® brand and coated with a fluidtight coating. This flexible bag 2 is intended to be slipped over the head of the user to isolate the head of the user from the external surroundings and incorporate the functionalities described hereinafter. In order to seal around the neck of the user and as described in FIG. 5, the base of the flexible bag 2 may comprise a flexible diaphragm or a fluidtight collar 12 intended to be fitted around the neck of a user. For example, this fluidtight collar 12 comprises a sheet of plastic (for example a polymer, notably a self-extinguishing polymer such as neoprene) that is pierced in order to allow the user's head to pass through elastically then tighten around his neck afterwards. The lower orifice for the head may be adapted to suit any neck circumference of between 28 and 42 cm for example.

The flexible bag 2 preferably delimits a volume of around ten litres around the head of the user and this may form a buffer volume of breathable gas that is sufficient to absorb spikes in the user's breathing. This inflated volume also makes it possible to absorb any mismatch between the decreasing output of an oxygen source and the relatively constant oxygen requirements of the user.

For preference, the flexible bag 2 is equipped on its front face with a curved visor with an anti-fog treatment on its interior face and an anti-scratch treatment on its exterior face and forming a transparent window 20 for the user.

Figure 3:
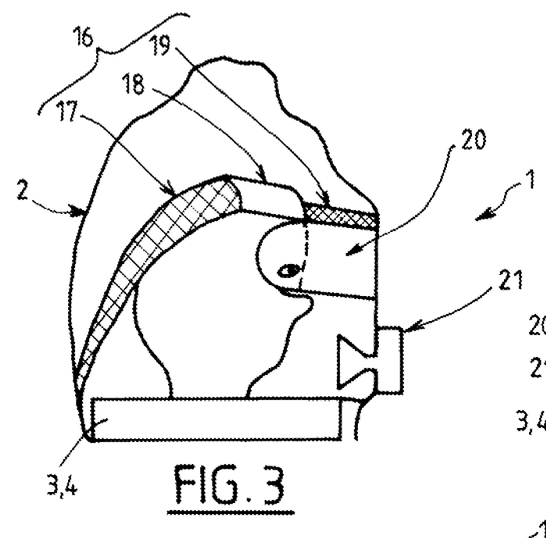
FIG. 3 depicts a schematic side view showing some of the hidden detail illustrating the structure of another possible embodiment of a hood according to the invention.

As may be seen in FIG. 3, the flexible bag 2 may also be provided with a phonic member 21 to facilitate direct communication or communication via an interphone or through a megaphone.

The lower part of the flexible bag 2 comprises a rigid base element 3, 4 of annular overall shape intended to be fitted around the neck of the user. The base element 3, 4 comprises a tubular oxygen reservoir of pressurized oxygen. This base element forms a mass which holds the full hood respirator 1 in place.

The full hood respirator 1 also comprises a calibrated outlet orifice 7 connected to the base element 3 and opening into the internal volume of the flexible bag 2, preferably in the rear part of the full hood respirator 1.

The oxygen reservoir of the base element 3 for example has a volume of between 0.20 and 0.4 litres and stores gas at a pressure of for example between 150 and 200 bar. The calibrated outlet orifice 7 has for example a diameter of between 0.04 and 0.15 mm in order to release for example between twenty and sixty litres of oxygen over fifteen minutes. The base element 3 may consist of a tube made of stainless steel or some other material, with a diameter of, for example, between 30 and 50 mm.

Figure 2:
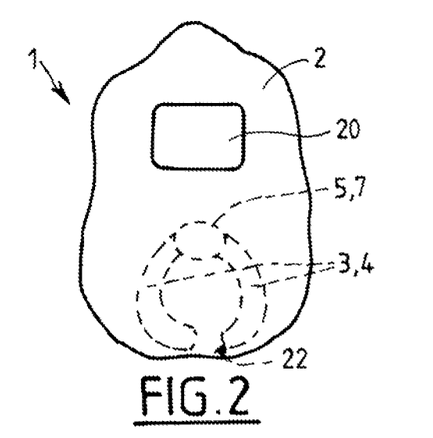
FIG. 2 is a view similar to FIG. 1 in which the full hood respirator is in the furled storage position.

According to one advantageous feature, the base element 3, 4 comprises at least two rigid parts connected together by an articulation 5. The two parts of the base element 3, 4 can be moved relative to one another between a furled first position that prevents a head from entering the full hood respirator 1 through the base element 3, 4 (cf. FIG. 2) and an unfurled position of use that allows a head to enter the full hood respirator 1 through the base element 3, 4 (cf. FIG. 1).

The base element is preferably secured to the base of the flexible bag 2, for example incorporated into a sleeve formed by the flexible bag 2.

Figure 6:
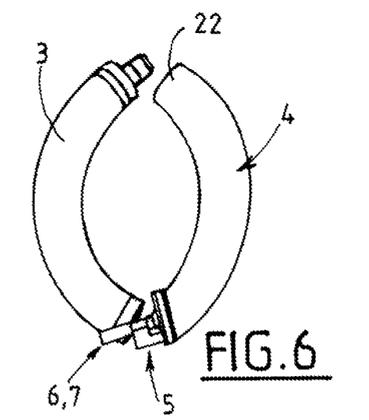
Figure 7:
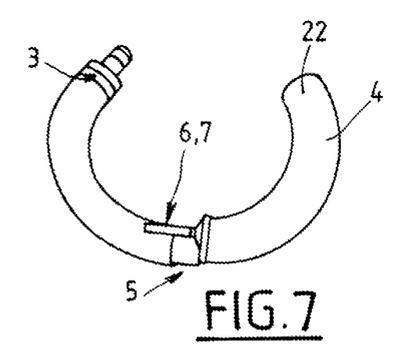

In the example depicted in the figures, the two articulated parts of the base element 3, 4 consist of two curved tubular portions connected at an articulation 5. The two parts of the base element 3, 4 in the unfurled position form an open ring (for example a C-shape as visible in FIG. 7). In the furled position (cf. FIG. 6) the two parts of the base element 3, 4 describe the shape of an ellipse.

For example, in the furled position, the longest transverse dimension (in a direction perpendicular to the top/bottom axis of the full hood respirator 1) of the central opening delimited by the base element 3, 4 is between five and ten cm. That is not enough to pass a head through. In the unfurled position, this longest transverse dimension of the central opening delimited by the base element is, for example, between twenty and forty cm, which is large enough for the vast majority of heads.

For example, the two parts of the base element 3, 4 pivot relative to one another at the articulation 5 between the furled and unfurled position in an angular range of between thirty and one hundred and eighty degrees (the angle between the two parts of the base element 3, 4 may vary for example between thirty degrees in the furled position and one hundred and eighty degrees in the unfurled position).

In the example depicted, the base element 3, 4 is made up of two articulated rigid parts. Of course, it is possible to conceive of a structure having more than two articulated parts (3 parts, 4 parts, etc). likewise, as an alternative, the base element 3, 4 may have the shape of a closed ring (articulated chain for example) or any other appropriate form.

Figure 13:
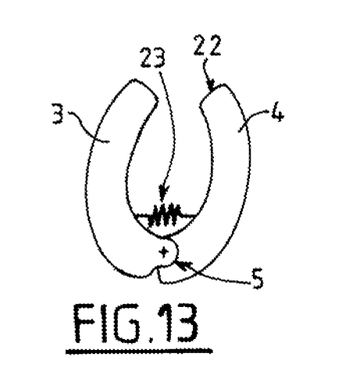
FIG. 13 depicts a view from above of a base element of the full hood respirator in the furled position according to another possible embodiment.

Likewise, in the above example, the two parts of the base element 3, 4 are more specifically made up, respectively, of a pressurized-oxygen reservoir and of a filter cartridge. As an alternative, the two articulated parts of the base element 3, 4 could be made up respectively of two distinct articulated oxygen reservoirs. In that case, the carbon dioxide filtration could be of the passive or active type and incorporated into another (third) articulated (furlable) or otherwise element. As illustrated schematically in FIG. 13, the base element may comprise a return member 23, such as a spring, which urges the articulated parts of the base element 3, 4 towards a determined position, notably the unfurled position. The return member 23 is preferably situated at the articulation 5.

Figure 10:
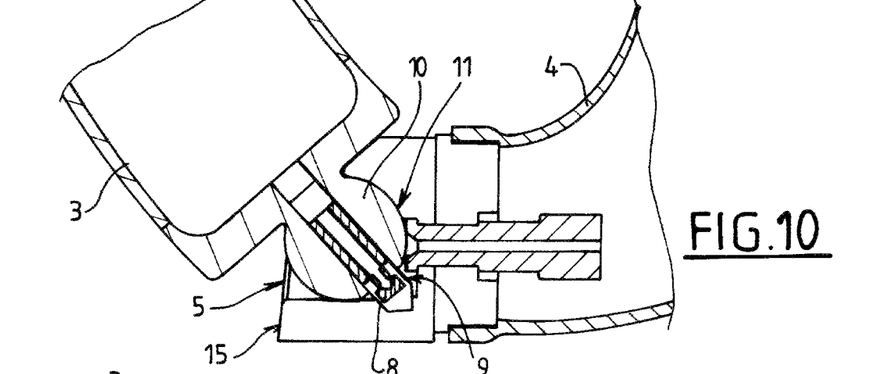
FIG. 10 is a sectioned view of a detail of one embodiment of an articulation of the base element of the full hood respirator according to the invention in a furled position.
Figure 11:
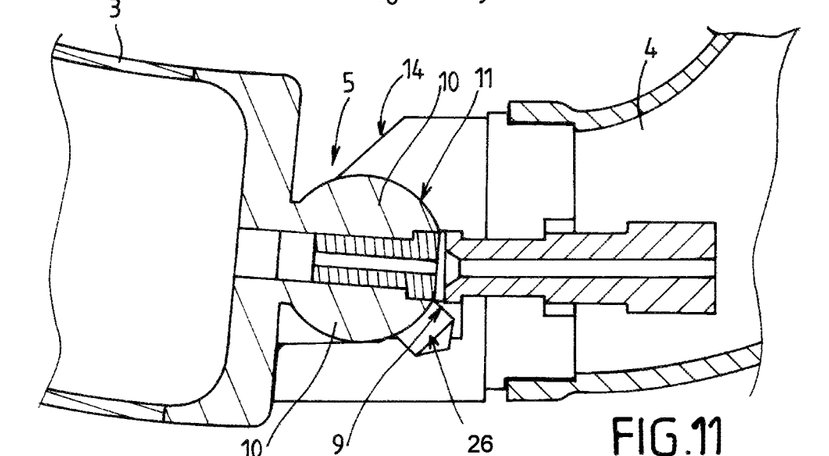
FIG. 11 depicts a view similar to that of FIG. 9, in an unfurled position.
Figure 12:
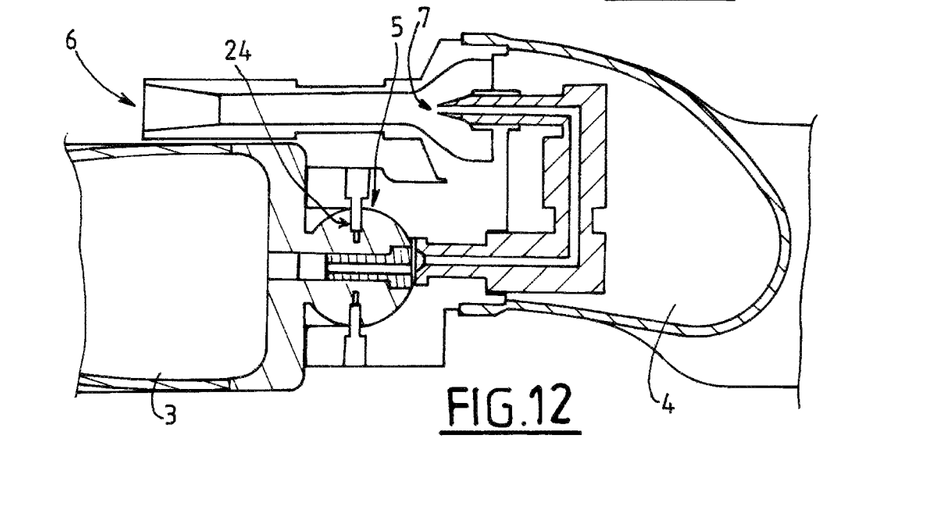
FIG. 12 depicts a view similar to that of FIG. 10 in an unfurled position on a different plane of section illustrating the gas supply orifice intended to supply gas to the inside of the full hood respirator.

As illustrated in FIGS. 10 to 12, the articulation 5 of the base element may comprise a wall joint provided with a male component 10 (for example spherical) and a complementary female component 11 belonging respectively to the two rigid parts of the base element 3, 4. As illustrated in FIG. 12, pins 24 may be provided to connect the male component 10 and female component 11 mechanically and limit the relative pivoting of the two components 10, 11 to a single plane.

Likewise, the full hood respirator 1 may comprise one or more mechanical stops 14, 15 respectively defining the furled and unfurled positions. These stops may constitute regions of contact between the two parts of the base element 3, 4, notably at the articulation 5 (cf. FIGS. 10 and 11).

The full hood respirator 1 may where appropriate also comprise a mechanism for keeping the relative position of the two rigid parts of the base element 3, 4 stable. For example, an elastic deformation system (snap-fastening or the like) may be provided in order to form a "hard point" in at least one of the following positions: the furled position, the unfurled position.

For preference, the opening of the ring formed by the unfurled position of the two parts of the base element 3, 4 is situated at the front face of the full hood respirator 1. That means to say that the open part of the ring is positioned on that side of full hood respirator 1 that comprises the transparent window 20. That makes it easier to fit the full hood respirator 1 over the head. This positioning of the opening makes it easier to accommodate the user's face, and notably any spectacles, the nose, the chin, etc.

This structure balances the distribution of weight around the head of the user. In addition, the centre of gravity of the system may thus be offset slightly towards the rear (with respect to the centre of the user's head).

For preference, the full hood respirator 1 comprises a cartridge 4 for filtering the air in the flexible bag 2 in order to remove the carbon dioxide generated when the user exhales. The filter cartridge 4 comprising an inlet 22 communicating with the interior volume of the flexible bag 2 (preferably at the front of the full hood respirator 1) and a filtered-air outlet 6 opening into the interior volume of the flexible bag 2 (preferably at the rear part of the flexible bag 2).

In that case, and as illustrated in the figures, the two parts of the base element 3, 4 are specifically made up, respectively, of a tubular oxygen reservoir (in this case, reference character 3) and of a carbon dioxide filter cartridge (in this case, reference character 4). These two devices preferably have similar mass and volume, making the whole nicely balanced.

For preference, the carbon dioxide filter cartridge 4 uses soda lime in granular form to capture the carbon dioxide. Of course any other suitable filtration system may be contemplated. For example, the carbon dioxide filter cartridge 4 may also use lithium hydroxide. The filtration product may be stored in the cartridge in the form of granules, sheets with canals or porous mats for example.

In general, the system that captures the carbon dioxide may be of the passive type (the interior of the breathable volume being lined with a compound that absorbs $CO_2$) or active (where the gas that is to be purified is captured and channelled through the filter element).

The reaction for fixing the carbon dioxide is generally an exothermic reaction. That allows the relatively warm gases coming from the filter cartridge 4 to mix with the relatively cooler oxygen leaving the tubular oxygen reservoir 3. That means that a gas temperature that is very acceptable to the user can be maintained.

Figure 8:
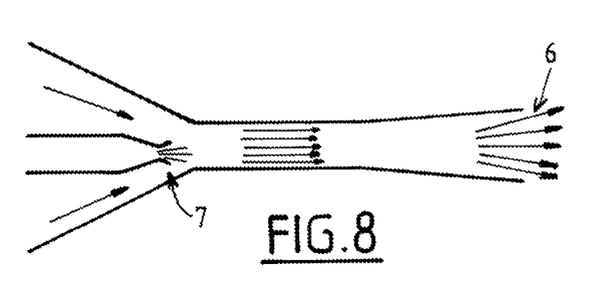
FIG. 8 illustrates one example of a venturi-effect gas-injection device that can be used in the hood according to the invention.
Figure 9:
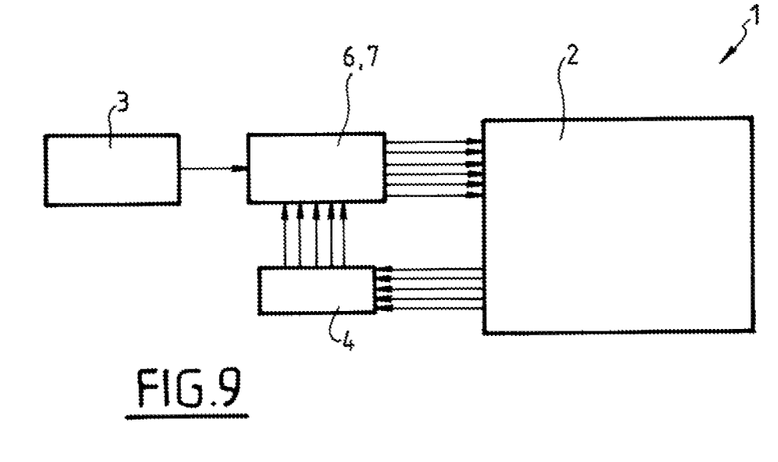
FIG. 9 depicts a schematic view illustrating how the gas-injection device is incorporated into and works in the full hood respirator according to the invention.

For preference also and as illustrated in FIGS. 8, 9 and 12, the calibrated outlet orifice 7 of the tubular oxygen reservoir 3 and the filtered-air outlet 6 of the filter cartridge 4 may be arranged relative to one another (particularly concentrically and coaxially) so as to form a venturi device. FIG. 9 schematically depicts the flows of gas using arrows. The oxygen is supplied by the tubular oxygen reservoir 3 to the venturi which therefore generates suction through the carbon dioxide filter cartridge 4. The oxygen-enriched breathable mixture is delivered to the flexible bag 2. This venturi device thus allows the energy of expansion of the gas supplied by the tubular oxygen reservoir 3 to be used to create a recirculation stream through the carbon dioxide filter cartridge 4 (soda lime or lithium hydroxide).

For preference, the venturi has an entrainment ratio (aspirated flow rate/injected flow rate) of between 10 and 20 over the range of injected flow rates of 1 to 5 litres per minute for example.

This carbon dioxide capture system is thus independent of the breathing of the user. In addition, during the first fifteen minutes of use, the venturi blows for example between twenty and forty-five litres of gas per minute. That makes a noise (blowing) audible to the user. That informs him that the equipment is working correctly.

This solution of the active filtration of the carbon dioxide produced by the user may be supplemented (or even replaced) by a passive filtration solution such as: lining the inside of the breathable volume with a compound which absorbs carbon dioxide or positioning one or more composite panels that absorb carbon dioxide at the key points (for example near the user's mouth).

As illustrated in FIG. 12, the calibrated outlet orifice 7 delivers the gas via a nozzle. This nozzle may be directed along, namely tangentially to, a portion of one of the two rigid parts of base element 3, 4. Of course other arrangements are possible. Thus, the nozzle that delivers the gas may make an angle, for example a right angle, with respect to the base element.

For preference, activation of the gas (release of oxygen into the full hood respirator 1) is initiated (preferably automatically) when the full hood respirator 1 is unfurled. Thus, for example, in its furled position, the pressurized gas from the tubular oxygen reservoir 3 is not placed in communication with a fluid circuit supplying the calibrated outlet orifice 7 whereas in its unfurled position the pressurized gas from the tubular oxygen reservoir 3 is placed in communication with a fluidic circuit supplying the calibrated outlet orifice 7. This initiation is preferably generated as soon as the pivoting movement of the articulation exceeds a set threshold of a few degrees, for example of between three and ten degrees.

For example, and as illustrated in the example of FIG. 10, the full hood respirator 1 may comprise a removable plug 8 arranged at the outlet of the tubular oxygen reservoir 3 and which prevents oxygen from flowing towards the calibrated outlet orifice 7 when the base element 3, 4 is in the furled position. The plug 8 does not, on the other hand, prevent oxygen from leaving the oxygen reservoir 3 via the calibrated outlet orifice 7 when the base element 3, 4 is moved from its furled position into its unfurled position.

For example, the removable plug 8 is moved and/or broken mechanically through collaboration with a stop 9 of the full hood respirator 1 when the base element 3, 4 is moved from its furled position into its unfurled position.

As illustrated in the example of FIGS. 10 and 11, after a few degrees of relative rotation of the two parts of the base element 3, 4, the removable plug 8 comes into abutment against a flank 9 of the carbon dioxide filter cartridge 4. For example, the removable plug 8 is borne by an end of the articulation 5 associated with the reservoir 3 whereas the stop which moves or breaks this removable plug 8 is borne by an adjacent portion of the carbon dioxide filter cartridge 4 in this example. For example, as the base element 3, 4 is unfurled, a lip severs the removable plug 8. The base element 3, 4 is dimensioned such that no user can put the full hood respirator 1 on without releasing the flow of oxygen. The risk of the operator forgetting to activate the full hood respirator 1 is thus set aside and activation of the supply of gas cannot cause the user to lose time.

As illustrated in FIG. 11, the articulation 5 or any other portion of the full hood respirator 1 may comprise a housing 26 (for example a blind hole) designed to recover and trap the removable plug 8 when broken (the removable plug is not depicted in FIG. 11).

Of course, as an alternative to a permanently broken removable plug 8, the removable plug 8 could simply be mobile and able to return elastically to its closed position when the full hood respirator 1 is furled again.

Irrespective of the articulated structure thereof and of the potential automatic release of oxygen upon unfurling, the full hood respirator 1 may potentially have an internal structure as described hereinbelow with reference to the embodiment of FIGS. 3 and 4.

Thus, the full hood respirator 1 may comprise, inside the flexible bag 2, a flexible suspension member 16. This suspension member 16 is fixed to the flexible bag 2 and forms an internal hat or cap having a surface area smaller than the surface area of the flexible bag 2. At least part of the border of the suspension member 16 is connected (bonded, stitched or the like) to the flexible bag 2, preferably a set distance from the upper end of the flexible bag 2. In this way, when the user slips the full hood respirator 1 on, this suspension member 16 rests on the top of the head of the user at a height somewhere between the base and the top of the full hood respirator 1 (cf. FIG. 3). What that means is, notably when the full hood respirator 1 is under pressure (oxygen is injected into the internal volume of the flexible bag 2), the full hood respirator 1 rests on (is suspended from) this suspension member 16 on the top of the head of the user.

For example, the suspension member 16 is attached to the flexible bag 2 at the front rear and side (for example at one attachment at the front, one attachment at the rear and two attachments at the sides which are situated respectively one on each side of the flexible bag 2). This allows the weight of the full hood respirator 1 to be distributed across the head of the user and also means that the base element 3, 4 (reservoir, filter cartridge, etc) does not rest on the user's shoulders.

In this way, the full hood respirator 1 may move with the head of the user, the transparent window 20 notably always remaining positioned in front of the user's eyes.

In addition, this structure keeps the viewing transparent window 20 vertical with respect to the top of the user's head. The full hood respirator 1 thus does not need to have a tightening buckle and/or a strap that has to be adjusted in order to maintain a good fit, because there is very little spread in the morphology of the top of the head of potential users. The structure of the full hood respirator 1 is thus universal and does indeed fit a large number of different users.

In addition, this structure allows the flexible bag 2 to inflate in order to form enough of a buffer volume without "floating" and moving around excessively around the user's head.

The suspension member 16 preferably comprises at least one rear portion 17 comprising at least one of the following: a flexible mesh, a cloth, a fabric, an elastic zone, a rigid zone, a semi-rigid zone.

Figure 4:
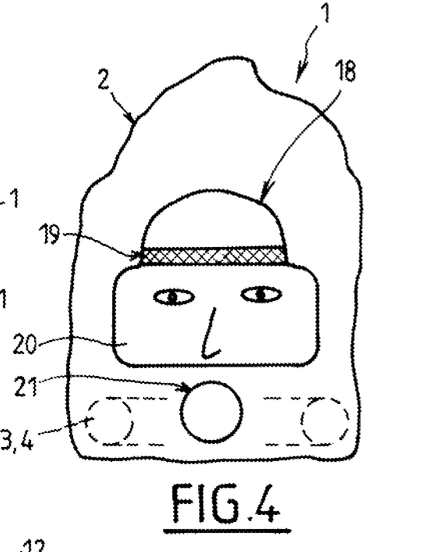
FIG. 4 depicts a schematic and partial front view illustrating the full hood respirator of FIG. 3.

In the example of FIGS. 3 and 4, the suspension member 16 comprises, from the rear of the full hood respirator 1 towards the front: a rear portion 17 comprising a flexible mesh, a front first portion 18 comprising a rigid or semi-rigid component and a front second portion 19 comprising a rigid or semi-rigid component forming a helmet visor.

The rear portion 17 is connected to the rear part of the flexible bag 2, preferably at the lower base thereof. The end of the front second portion 19 (helmet visor) is itself connected to the front end of the flexible bag 2, preferably above the viewing transparent window 20.

That allows the transparent window 20 to be held a set distance away from the user's face (cf. FIG. 3). That makes the equipment easier to use with spectacles and improves user comfort, even for those with large noses.

The rear portion 17, preferably made of a flexible or even elastic mesh, essentially rests on the rear half of the user's head and allows an easy fit for female users wearing their hair in a bun or wearing hair slides (female cabin crew for example). That allows the full hood respirator 1 to fit and be positioned correctly on any type of user by distributing the centre of gravity of the full hood respirator 1 for greatest user comfort.

Of course, the suspension member 16 could be formed of a single flexible or semi-rigid portion.

The suspension member 16 allows the base element 3, 4 to be suspended and allows the centre of gravity of the full hood respirator 1 to be re-centred with respect to the head of the user by fitting any type of hair style. This suspension system allows the function of holding the full hood respirator 1 in place to be disassociated from the function of forming a buffer volume. In this way, the full hood respirator 1 may constitute an adequate buffer volume while at the same time being correctly positioned and following head movements.

Thus, while being of simple and inexpensive structure, the full hood respirator 1 according to the invention offers numerous advantages over the prior art.

In particular, the full hood respirator 1 offers better ergonomics, displaying the possibility of having a large volume of gas around the user's head. Its structure, donning and wearing limit the risks of error, discomfort and the feeling of confinement. The full hood respirator 1 has a universal structure which fits a broad spread of morphologies (sizes, spectacles, hair styles, etc.).

The size needed is not increased and is even reduced in the case of the folding structure.

Thus the invention may have the following advantages:

Purification of carbon dioxide in the full hood respirator can be independent of the way in which the user breathes. What that means to say is that there is no risk of poor purification even if the user breaths in small puffs (is short of breath/exhibiting the panting typical of a state of panic).

By contrast, solutions employing passive filtration are generally less effective and entail oversizing the amount of filter agent.

Unlike other known devices, the breathing resistance is zero or very low, making it very comfortable for the user to use.

Unlike the known solutions that use half-masks, the full hood respirator is not subject to a risk of poor sealing.

The active carbon dioxide filtration system means that the quantity of filter substance carried can be optimized.

The full hood respirator uses no moving parts to supply the gas. That makes the whole system more reliable.

The venturi device can be produced by injection moulding of plastic. This allows its cost to be reduced.

The ergonomics of the full hood respirator are improved because of the balanced distribution of its mass and its non-inhibiting positioning. The full hood respirator can be put on easily and comfortably even if the user wears spectacles.

The folding structure is reliable and robust via its rigid articulation and its sealing for any angular opening.

In comparison with the known solutions (venturi system placed behind the head of the user, down his back or on his chest), the above solution is better balanced and more ergonomic around the user's head.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A full hood respirator comprising a fluidtight flexible bag adapted and configured to be slipped over a head of a user, the flexible bag being provided with a transparent window and comprising, in a lower part of the flexible bag, a rigid base element comprising a tubular oxygen reservoir of pressurized oxygen provided with a calibrated outlet orifice opening into an internal volume of the flexible bag and two rigid curved tubular portions each having first and second ends, the first ends being connected by a ball joint equipped with a male component and a female component, each of the male and female components being situated on a respective one of the two rigid curved tubular portions, the second ends not being connected to one another, the two rigid curved tubular portions lying in a same plane and being pivotally movable relative to one another between, on one hand, a furled orientation of an open elliptical shape that prevents the head of the user from entering the hood through the base element and prevents pressurized gas from the oxygen reservoir from being placed in fluidic communication with the calibrated outlet orifice, and on the other hand, an unfurled orientation of an open ring shape intended to be positioned around a neck of the user and which allows pressurized gas from the oxygen reservoir to be in communication with the calibrated outlet orifice, and which allows the head of the user to enter the hood through the base element.

2. The hood of claim 1, wherein the ring opening formed by the two parts in the unfurled orientation is situated in the region of a front face of the hood, a front face of the hood including the transparent window.

3. The hood of claim 1, wherein the two rigid curved tubular portions of the base element pivot relative to one another at the ball joint between the furled and unfurled orientations through an angular range comprised between thirty and one hundred and eighty degrees.

4. The hood of claim 1, wherein a first of the two rigid curved tubular portions of the base element is a tubular oxygen reservoir and a second of the two rigid curved tubular portions of the base element is a carbon dioxide filter cartridge, the filter cartridge comprising an inlet communicating with the interior volume of the flexible bag and a filtered-air outlet opening into the interior volume of the flexible bag, the outlet orifice of the tubular oxygen reservoir and the filtered-air outlet of the filter cartridge being arranged relative to one another in such a way so as to form a venturi device.

5. The hood of claim 1, wherein the two rigid curved tubular portions of the base element comprise two tubular oxygen reservoirs articulated to one another and having at least one oxygen outlet orifice opening into the flexible bag.

6. The hood of claim 1, wherein the removable plug is situated in a vicinity of the ball joint.

7. The hood of claim 1, wherein the outlet orifice comprises a nozzle directed along a portion of one of the two rigid curved tubular portions.

8. The hood of claim 1, further comprising mechanical stops defining the furled and unfurled orientations.

9. The hood of claim 1, further comprising a removable plug preventing oxygen from the oxygen reservoir from exiting the calibrated outlet orifice when the base element is in the furled orientation and automatically allowing oxygen to exit the oxygen reservoir via the calibrated outlet orifice when the base element is moved from its furled orientation into its unfurled orientation.

10. The hood of claim 9, wherein the removable plug is moved and/or broken mechanically by collaboration with a stop on the hood when the base element is placed into the unfurled orientation from the furled orientation.

* * * * *